Aug. 18, 1964  I. H. MORRISON  3,145,152
FUEL ELEMENTS FOR NUCLEAR REACTORS
Filed March 2, 1961
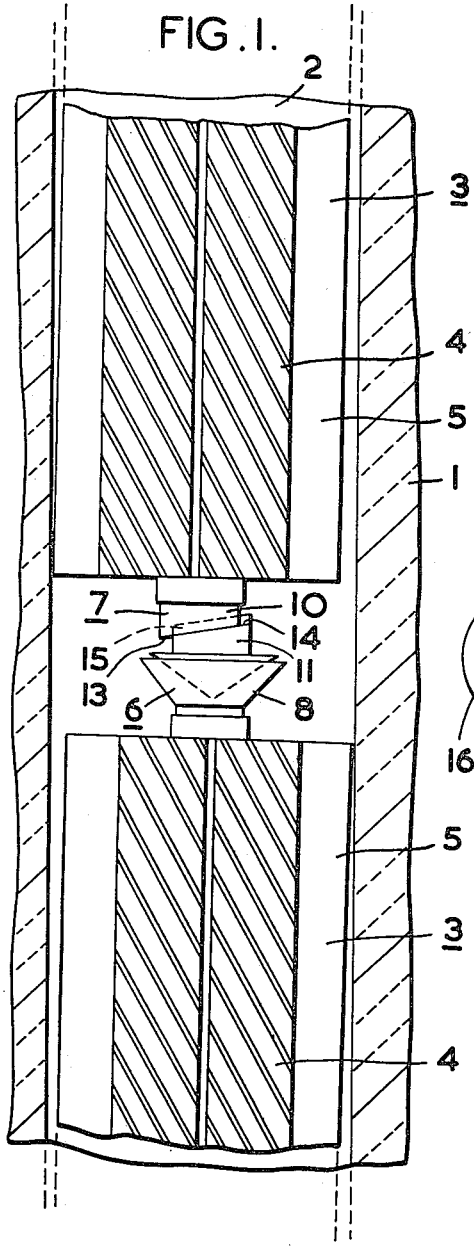
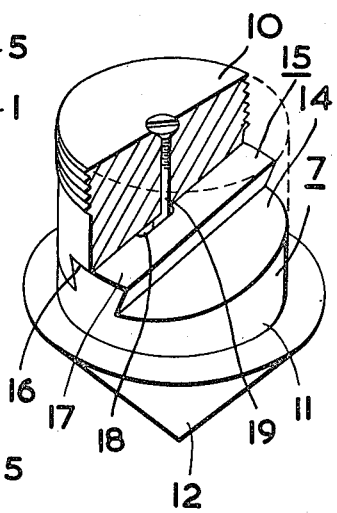
INVENTOR
Ian Hugh Morrison
BY
Larson and Taylor

United States Patent Office 3,145,152
Patented Aug. 18, 1964

3,145,152
FUEL ELEMENTS FOR NUCLEAR REACTORS
Ian Hugh Morrison, Ashton, Preston, England, assignor to United Kingdom Atomic Energy Authority, London, England
Filed Mar. 2, 1961, Ser. No. 92,938
Claims priority, application Great Britain Mar. 2, 1960
5 Claims. (Cl. 176—77)

This invention relates to nuclear reactor fuel elements and to attachments therefor.

It is well known to fuel a gas-cooled nuclear reactor with columns of fuel elements of elongate form, each column consisting of an end to end stack of fuel elements which have end attachments, such as cups and cones, allowing the elements to locate with and stack with adjacent elements and which have side attachments, such as spider arms or longitudinal fins, to assist in centering the columns in coolant channels passing through a moderator structure. The side attachments cannot be a tight fit in the coolant channels as this would prevent or hinder refuelling of the reactor, and not allow for distortion of the fuel. Hence it is arranged that the overall dimensions of the side attachments are somewhat smaller (e.g. 0.60″) than that of the channel of the reactor in which the fuel elements are to be used. It is now discovered that in certain circumstances (which appear to be closely related to fin arrangements on the fuel elements) the fuel elements vibrate when subjected to coolant flow and can thereby sustain appreciable damage.

The present invention is accordingly directed to means for stabilising a column of stacked fuel elements of elongate form against vibration when subjected to coolant flow.

The invention resides in a nuclear reactor fuel element of elongate form and capable of occupying a position in a vertical fuel element channel in a gas-cooled nuclear reactor, said fuel element including an end attachment having a part slidably secured thereto, and said part having end locating means for locating engagement with an adjacent fuel element when the fuel element is stacked with other similar fuel elements in a fuel element channel, whereby relative lateral displacement of adjacent fuel elements can take place so as to cause contact of a part of the fuel elements with the channel wall.

An embodiment of the invention will now be described by way of example with reference to the accompanying drawings in which:

FIGURE 1 is a section through the moderator structure of a nuclear reactor showing a fuel element channel loaded with fuel elements which have end attachments for stabilisation of the fuel elements against vibration in the channel in accordance with the invention.

FIGURE 2 is an isometric part sectional detail of an end attachment as shown in FIGURE 1.

In FIGURE 1 there is shown part of a graphite moderator structure 1 of a nuclear reactor in which refuelling is from the top face. A vertical channel 2 in the moderator structure 1 is loaded with fuel elements 3. The fuel elements 3 have helical heat transfer fins shown schematically at 4 and are fitted with longitudinal splitter fins 5 of which there are four in number to each fuel element, equispaced around the periphery of the elements. The fuel element 3 is shown stacked end-to-end one on top of another similar fuel element also designated 3 and each element 3 has an upper end locating member 6 and a lower end locating member 7 providing for location of the fuel elements 3 with respect to each other in the channel 2. The upper end locating member 6 of each fuel element 3 comprises a conical cup shaped body 8 which is screwed into the end of the fuel element. The lower end locating member 7 of each fuel element 3 is in two parts, i.e. an upper or first part 10 which screws into the end of the fuel element 3 and a lower or second part 11 which has a conical part 12 which is complementary to and adapted to engage with the conical cup shaped body 8 of the upper end locating member fitted to a lower adjacent fuel element 3. The two parts 10 and 11 of the lower end locating member 7 are in sliding engagement at mating faces 13 and 14 which are inclined at an angle of about 15° to the transverse plane of end locating member 7. As shown in FIGURE 2 the lower part 11 of the end locating member 7 is connected with the upper part 10 by a V or dovetail slide arrangement 15. The upper part 10 has a V or dovetail slide groove 16 while the lower part 11 has a complementary shaped tongue 17. The shaped tongue 17 has a milled slot 18 and the upper part 10 of the end locating member 7 is fitted with a pin 19 which engages with the slot 18 and acts as stop means limiting relative sliding motion of the parts 10 and 11.

To illustrate the operation of the described construction, consider that the lower fuel element 3 shown in FIGURE 1 is in position in the fuel element channel 2 while the upper fuel element 3 is yet to be charged. The upper fuel element 3 is suspended from a grab (not shown) which engages with its upper end locating member 6 and is lowered by means of the grab down the channel 2. Because of the weight of the parts 11 and 12, the upper and lower parts 10 and 11 of the lower end locating member 7 of the fuel element will be in line as shown in FIGURE 2. The fuel element 3 is lowered down the channel 2 until the conical part 12 of its lower end locating member 7 engages with the cup shaped body 8 of the upper end locating member 6 carried by the lower fuel element 3 already in the channel 2. As the fuel element 3 is further lowered the upper part 10 of its end locating member 7 slides relatively to the lower part 11 which is held by the cup-and-cone engagement with the upper end locating member 6 of the lower fuel element 3. This movement causes the fuel element 3 to tilt in the channel 2 until brought to rest by the corner of the longitudinal splitter fins 5 contacting the wall of the channel 2. The fuel element 3 is held in this position (as shown by FIGURE 1 in which for the sake of clarity the tilt is exaggerated) by the wedge action of the co-operating upper and lower parts 10 and 11 of the lower end locating member 7. Thus each fuel element 3 is prevented from vibrating when subjected to coolant flow through the channel 2.

I claim:

1. A nuclear fuel element of elongate form for use in a vertically stacked column of similar nuclear fuel elements, disposed end-to-end in the column, the said element including: a cup-shaped locating member at one end thereof and a complementary locating member at the other end thereof, the locating members each engaging a locating member of an immediately adjacent fuel element; one of said locating members comprising a first part fixed relative to said fuel element, a second part displaceable relative to said first part, and means positively interconnecting the first and second parts and limiting the relative displacement to displacement in a predetermined plane inclined at an angle of about 15 degrees to the transverse plane of said column.

2. A nuclear fuel element of elongate form for use in a vertically stacked column of similar nuclear fuel elements, disposed end-to-end in the column, the said element including: a cup-shaped locating member at one end thereof and a complementary locating member at the other end thereof, the locating members each engaging a locating member of an immediately adjacent fuel element; one of said locating members comprising a first part fixed relative to said fuel element, a second part displaceable relative to said first part, and means positively interconnecting the first and second parts and limiting the relative displacement to displacement substantially lateral to said column; said interconnecting means comprising a dovetail groove defined by one of said parts, and a corresponding dovetail tongue engaged in said groove, the said parts being slidable relative to each other and the displacement being limited to movement in a predetermined direction.

3. A nuclear fuel element according to claim 2 and further comprising stop means for limiting the sliding movement in the predetermined direction.

4. In a nuclear fuel element of elongate form for use in a nuclear reactor fuel element channel, the improvement comprising a first locating means attached at one end of said element, the said locating means including a first part fixed to the fuel element at the said one end, a second part slidably secured to a side of the first part remote from the fuel element for relative displacement therewith, and means interconnecting the first and second parts for limiting the relative displacement to movement in a predetermined linear direction in a predetermined plane, the limiting means comprising a dovetail groove defined by one of said parts and a corresponding dovetail tongue defined by the other of said parts engaged in said groove.

5. The improvement according to claim 4 and further comprising stop means for further limiting the movement in the predetermined direction.

References Cited in the file of this patent

UNITED STATES PATENTS

| | | |
|---|---|---|
| 2,885,335 | Moore et al. | May 5, 1959 |
| 2,983,662 | Shillitto et al. | May 9, 1961 |

FOREIGN PATENTS

| | | |
|---|---|---|
| 563,703 | Belgium | July 3, 1958 |
| 1,063,290 | Germany | Aug. 13, 1959 |
| 875,462 | Great Britain | Aug. 23, 1961 |